United States Patent
Chung et al.

(10) Patent No.: US 10,133,162 B1
(45) Date of Patent: Nov. 20, 2018

(54) PROJECTION DISPLAY APPARATUS INCLUDING EYE TRACKER

(71) Applicant: SAMSUNG ELECTRONICS CO., LTD., Suwon-si (KR)

(72) Inventors: Jaeseung Chung, Suwon-si (KR); Geeyoung Sung, Daejeon (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/883,570

(22) Filed: Jan. 30, 2018

(30) Foreign Application Priority Data

Jul. 24, 2017 (KR) .......................... 10-2017-0093694

(51) Int. Cl.
  *G03B 21/20* (2006.01)
  *G06F 3/01* (2006.01)
  *G06K 9/00* (2006.01)
  *G02B 27/01* (2006.01)

(52) U.S. Cl.
  CPC ..... *G03B 21/2033* (2013.01); *G02B 27/0101* (2013.01); *G06F 3/013* (2013.01); *G06K 9/00671* (2013.01); *G02B 2027/0181* (2013.01)

(58) Field of Classification Search
  CPC ........ G03B 21/10; G03B 21/28; G03B 21/30; G03B 21/2033; G02B 27/01; G02B 27/17; G02B 27/0093; G02B 27/0172; G02B 27/0101; G02B 27/2264; G02B 2027/014; G02B 2027/134; G02B 2027/138; G02B 2027/174
  See application file for complete search history.

(56) References Cited

U.S. PATENT DOCUMENTS

| | | | |
|---|---|---|---|
| 6,219,435 B1 | 4/2001 | Horikoshi et al. | |
| 6,445,365 B1 | 9/2002 | Taniguchi et al. | |
| 2014/0146394 A1* | 5/2014 | Tout ...................... | G09B 9/307 359/630 |
| 2015/0241701 A1* | 8/2015 | Schowengerdt ..... | H04N 13/383 359/633 |
| 2018/0096461 A1 | 4/2018 | Okayama et al. | |

FOREIGN PATENT DOCUMENTS

| | | |
|---|---|---|
| JP | 7-077665 A | 3/1995 |
| JP | 2004-056335 A | 2/2004 |
| JP | 2016-191845 A | 11/2016 |

* cited by examiner

*Primary Examiner* — Sultan Chowdhury
(74) *Attorney, Agent, or Firm* — Sughrue Mion, PLLC

(57) ABSTRACT

A projection display apparatus that tracks a user's eye with an eye tracker and displays a high-resolution image at a position of the user's eye. The projection display apparatus includes an eye tracker configured to track an eye of a user; a projector configured to project an image; and a controller configured to control the projector, based on a position of the eye of the user obtained from the eye tracker, to perform a first operation to project a first portion of the image at a first resolution onto a first region with respect to the position of the eye of the user, and to perform one of a second operation to project a second portion of the image at a second resolution lower than the first resolution onto a second region excluding the first region, and a third operation to refrain from projecting the image in the second region.

23 Claims, 6 Drawing Sheets

PROJECTION DISPLAY APPARATUS INCLUDING EYE TRACKER

CROSS-REFERENCE TO RELATED APPLICATION

This application claims priority from Korean Patent Application No. 10-2017-0093694, filed on Jul. 24, 2017, in the Korean Intellectual Property Office, the disclosure of which is incorporated herein in its entirety by reference.

BACKGROUND

1. Field

The present disclosure relates to a projection display apparatus, and more particularly, to a projection display apparatus that tracks a user's eye with an eye tracker and displays a high-resolution image at a position of the user's eye.

2. Description of the Related Art

Projection display apparatuses are used in various fields because they have an advantage in that they may be used to realize a large-sized screen with a relatively inexpensive and simple structure. For example, projection display apparatuses have been applied in fields such as outdoor shows, digital signage, head-up displays, home micro-projectors, mobile apparatus type projectors, and eyeglass type projectors. In particular, in recent years, interest in augmented reality (AR), head-up displays (HUDs) for automobiles, etc., is increasing and studies are being conducted to increase image resolution while further miniaturizing projection display apparatuses.

SUMMARY

According to an aspect of an exemplary embodiment, there is provided a projection display apparatus comprising: an eye tracker configured to track an eye of a user; a projector configured to project an image; and a controller configured to control the projector, based on a position of the eye of the user obtained from the eye tracker, to perform a first operation to project a first portion of the image at a first resolution onto a first region with respect to the position of the eye of the user, and to perform one of a second operation to project a second portion of the image at a second resolution lower than the first resolution onto a second region excluding the first region, and a third operation to refrain from projecting the image in the second region.

The projector may comprises: a laser light source configured to emit a laser beam; a light source driver configured to drive the laser light source; a scanner configured to scan the laser beam; and a projection optical system configured to project the image based on the laser beam scanned by the scanner.

The scanner may be a microelectromechanical systems (MEMS) scanner.

The controller may be further configured to control the light source driver based on the position of the eye of the user obtained from the eye tracker.

The controller may be further configured to reduce a size of a pixel in the first region by controlling the light source driver to increase a driving speed of the laser light source while the first portion of the image is projected onto the first region.

The controller may be further configured to increase a size of a pixel in the second region by controlling the light source driver to reduce a driving speed of the laser light source while the second portion of the image is projected onto the second region.

The pixel size of the second region may be an integral multiple of a size of a pixel of the first region.

The projection display apparatus may further comprise: an image capturing apparatus configured to obtain an electrical signal; and an image processor configured to process the electrical signal obtained by the imaging apparatus to generate image data.

The controller may be further configured to control the image processor to generate the first portion of the image having the first resolution corresponding to the first region and the second portion of the image having the second resolution corresponding to the second region.

The projection display apparatus may be configured to display the image in real time based on the image data.

The controller may be further configured to control the image capturing apparatus to capture only the first portion of the image corresponding to the first region.

The projector may comprise: a first projector configured to project the first portion of the image having the first resolution onto the first region; a second projector configured to project the second portion of the image having the second resolution to both the first region and the second region or only to the second region; and an image steering apparatus configured to adjust a direction of the portion of the image projected from the first projector.

The controller may be further configured to control the image steering apparatus to project the first portion of the image onto the first region with respect to the position of the eye of the user in response to the position of the eye of the user obtained from the eye tracker.

The image steering apparatus may comprise one of: a galvanometer mirror configured to reflect the projected image in a desired direction; a refracting optical system configured to refract the projected image to adjust a traveling direction of the projected image; an actuator configured to adjust an angle of the first projector; a linear motor configured to adjust the angle of the first projector, and a rotation type motor configured to adjust the angle of the first projector.

The projection display apparatus may further comprise: an image capturing apparatus configured to obtain an electrical signal; and an image processor configured to process the electrical signal obtained by the image capturing apparatus to generate image data.

The controller may be further configured to control the image processor to generate first image data corresponding to the first portion of the image having the first resolution to be provided to the first projector and second image data corresponding to the second portion of the image having the second resolution to be provided to the second projector.

The first and second projectors may comprise one of digital light processing (DLP), liquid crystal on silicon (LCoS), and microelectromechanical systems (MEMS) scanner type projectors.

The controller may be further configured to control the first projector based on the first image data and control the second projector based on the second image data.

According to an aspect of another exemplary embodiment there is provided a head-up display apparatus comprising: a projection display apparatus comprising: an eye tracker configured to track an eye of a user; a projector configured to project an image; and a controller configured to control the projector based on a position of the eye of the user obtained from the eye tracker, to perform a first operation to project a first portion of the image at a first resolution onto a first region with respect to the position of the eye of the user and to perform one of a second operation to project a second portion of the image at a second resolution lower than the first resolution onto a second region excluding the first region and an a third operation to refrain from projecting the image in the second region.

According to an aspect of another exemplary embodiment there is provided an augmented reality apparatus comprising: a projection display apparatus comprising: an eye tracker configured to track an eye of a user; a projector configured to project an image; and a controller configured to control the projector based on a position of the eye of the user obtained from the eye tracker, to perform a first operation to project a first portion of the image at a first resolution onto a first region with respect to the position of the eye of the user and to perform one of a second operation to project a second portion of the image at a second resolution lower than the first resolution onto a second region excluding the first region and a third operation to refrain from projecting the image in the second region.

According to an aspect of another exemplary embodiment there is provided a projection display apparatus comprising: a projector comprising: a laser light source configured to emit a laser beam; a scanner configured to scan the laser beam; and a projection optical system configured to project an image based on the laser beam scanned by the scanner; and a controller configured to: receive eye tracking information on an eye of a user; control the laser light source to operate at a first driving speed while projecting a first portion of the image to a first region corresponding to a position of the eye of the user in the eye tracking information; and control the laser light source to operate at a second driving speed while projecting a second portion of the image to a second region, wherein the first driving speed is higher than the second driving speed.

The scanner may be further configured to: divide at least a pixel of the first portion of the image projected to the first region based on the first driving speed; and merge two or more of the pixels of the second portion of the image projected to the second region based on the second driving speed.

The second portion of the image may include the first portion of the image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
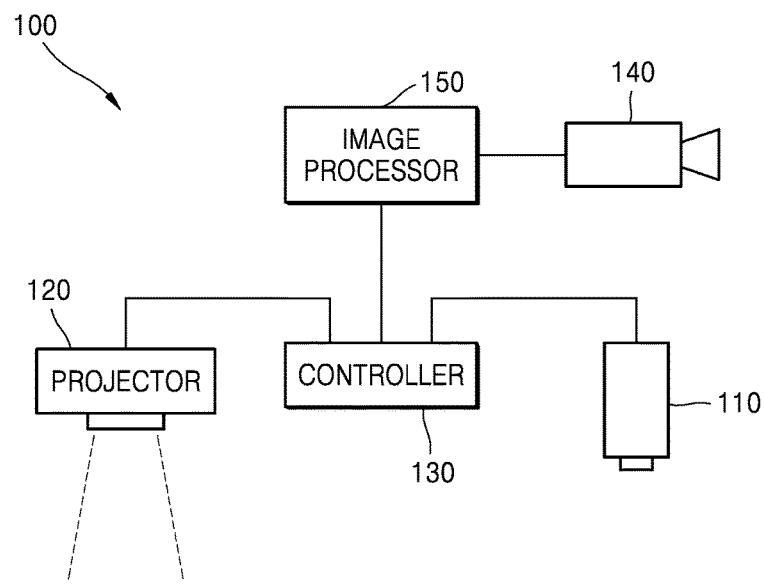
FIG. 1 is a schematic diagram showing a structure of a projection display apparatus according to an exemplary embodiment.

Hereinafter, with reference to the accompanying drawings, a projection display apparatus including a steering viewing window will be described in detail. Like reference numerals refer to like elements throughout, and in the drawings, sizes of elements may be exaggerated for clarity and convenience of explanation. The exemplary embodiments described below are merely an example, and various modifications may be possible from the exemplary embodiments. In a layer structure described below, an expression "above" or "on" may include not only "immediately on in a contact manner" but also "on in a non-contact manner".

FIG. 1 is a schematic diagram showing a structure of a projection display apparatus 100 according to an exemplary embodiment. Referring to FIG. 1, the projection display apparatus 100 according to an exemplary embodiment may include an eye tracker 110 for tracking a user's eye, a projector 120 for projecting an image, and a controller 130 for controlling an operation of the projector 120 in response to a position of the user's eye obtained from the eye tracker 110. The eye tracker 110 may obtain an image of a user through a camera or the like, detect a user's pupil in the image, and analyze a position of the user's pupil. Also, the eye tracker 110 may track a change in the position of the user's pupil in real time and provide a result of tracking to the controller 130. The controller 130 may then control an operation of the projector 120 in response to the change in the position of the user's pupil input from the eye tracker 110.

Figure 2:
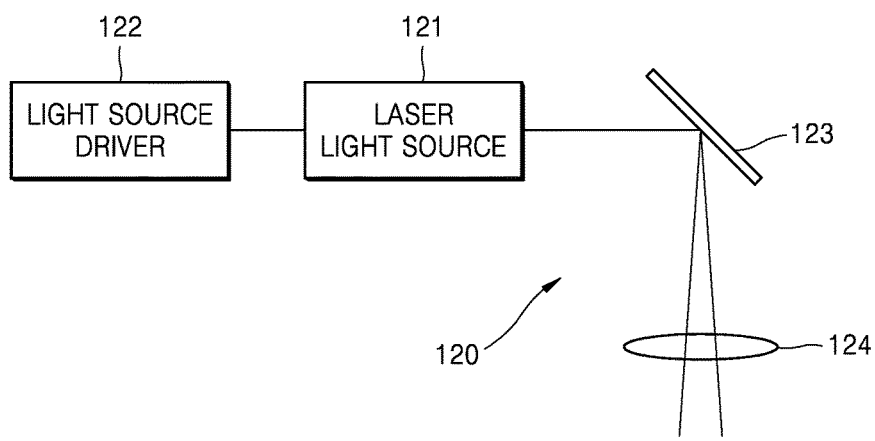
FIG. 2 is a schematic diagram showing an exemplary configuration of a projector of the projection display apparatus shown in FIG. 1.

FIG. 2 is a schematic diagram showing an exemplary configuration of the projector 120 of the projection display apparatus 100 shown in FIG. 1 according to an exemplary embodiment. Referring to FIG. 2, for example, the projector 120 may include a laser light source 121 that emits a laser beam, a light source driver 122 that drives the laser light source 121, a scanner 123 that scans the laser beam, and a projection optical system 124 that projects an image. Although briefly shown in FIG. 2, the laser light source 121 may include, for example, a red laser, a green laser, and a blue laser. The light source driver 122 may drive the laser light source 121 under control of the controller 130. For example, on/off of each of the red laser, the green laser and the blue laser of the laser light source 121, output intensity of the laser beam emitted from each of the red laser, the green laser and the blue laser of the laser light source 121, etc. may be adjusted by the light source driver 122.

The scanner 123 serves to scan the laser beam emitted from the laser light source 121 at high speed on to a screen in vertical and horizontal directions. Here, the screen reflects/scatters light so that the image is visible, and may be a dedicated component included in the projection display apparatus 100, but is not limited thereto. For example, the screen may be an indoor wall surface, a front glass surface of a vehicle, or a lens surface of augmented reality glasses. The scanner 123 may be, for example, a microelectromechanical systems (MEMS) scanner including a minute MEMS mirror. The scanner 123 may reflect an incident laser beam in a desired direction by electrically controlling a tilt angle of the MEMS mirror. The projection optical system 124 may focus the laser beam scanned by the scanner 123 on to the screen to form a clear image.

In this structure, the controller 130 may control the light source driver 122 according to image data of the image to be reproduced so that the light source driver 122 generates a red laser beam, a green laser beam, and a blue laser beam and the scanner 123 may scan each laser beam on the screen at high speed so that the image may be reproduced on the screen. The image to be reproduced may be stored in advance in a data storage device (not shown).

However, when the projection display apparatus 100 is used in, for example, a head-up display apparatus or an augmented reality apparatus, the projection display apparatus 100 may further include an image capturing apparatus 140 that receives external light and generates an electrical signal and an image processor 150 that processes the electrical signal obtained from the image capturing apparatus 140 and generates image data in order to provide a user with image information in real time. The image processor 150 may provide the image data generated by processing the electrical signal obtained from the image capturing apparatus 140 to the controller 130. The controller 130 may control the light source driver 122 according to the image data so that the projection display apparatus 100 may display the image in real time. The image processor 150 may also read image files stored in the data storage device (not shown) to generate the image data, or may combine image data obtained from previously stored image files and the real-time image data obtained through the image sensing apparatus 140 to generate new image data.

According to an exemplary embodiment, the controller 130 and the image processor 150 may be implemented as separate semiconductor chips. According to another exemplary embodiment, the controller 130 and the image processor 150 may be implemented as a single semiconductor chip. According to yet another exemplary embodiment, the controller 130 and the image processor 150 may be implemented in the form of software executable on a computer, other than hardware.

According to an exemplary embodiment, in the case of a digital lighting processing (DLP) type projector, a physical resolution is determined by the number of micromirrors of a micromirror array. In the case of a liquid crystal on silicon (LCoS) projector, a physical resolution is determined by liquid crystals, whereas, in the case of a projector including the scanner 123 using MEMS technology, the resolution is not physically determined, and a size of pixels is not previously determined. For example, the resolution and the pixel size of the projection display apparatus 100 may be adjusted according to driving speed of the light source driver 122, the laser light source 121, and the scanner 123 and calculation performance of the controller 130 and the image processor 150. Although the light source driver 122, the laser light source 121 and the scanner 123 that are currently commercialized have a sufficient driving speed to provide an image of high definition (HD) or ultra high definition (UHD) resolution, a burden on the image processor 150 may increase when the HD or UHD resolution image is provided for the entire screen.

In order to reduce the burden on the image processor 150, the projection display apparatus 100 according to an exemplary embodiment of the present disclosure may increase the resolution by concentrating on a region that the user wants to see based on a position of a user's pupil input from the eye tracker 110. For example, it is possible to intentionally increase the resolution of the region on a screen that the user intends to view and reduce the resolution of a remaining region in the entire screen, thereby reducing the burden on the image processor 150. That is, according to an exemplary embodiment, a resolution of a first portion of an image corresponding to a first region of screen that is determined to be a region of the screen that the user intends to view is determined to be higher that a resolution of a second portion of the image corresponding to a second region of the screen, different from the first region. According to an exemplary embodiment, the second region of the screen may be determined to be region of the screen that the user does not intend to view. To this end, the controller 130 may control operations of the image processor 150 and the projector 120 based on the position of the user's pupil input from the eye tracker 110.

Figure 3:
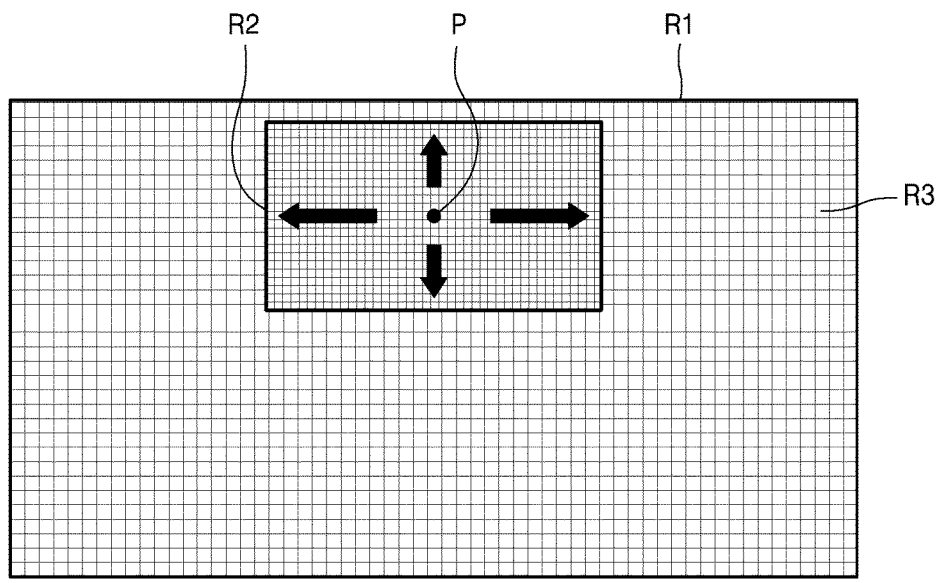
FIG. 3 schematically shows an example of selecting a high-resolution image region in an entire screen region in consideration of a position of a user's eye.

According to an exemplary embodiment, FIG. 3 schematically shows an example of selecting a high-resolution image region in an entire screen region R1 in consideration of a position of a user's eye. Referring to FIG. 3, the full screen region R1 may be the overall size of a general image that the projection display apparatus 100 may display on a screen. The eye tracker 110 may detect a position of a user's pupil, determine the position of the user's eye on the entire screen region R1 and transmit information about the position of the user's eye to the controller 130. Thereafter, the controller 130 may select a fixed region with respect to the position of the user's eye as a high resolution region R2. For example, if a point P shown in FIG. 3 is the position of the user's eye, the controller 130 may select the high resolution region R2 in consideration of an angle that the human eye normally perceives at a time with respect to the point P.

The controller 130 may then provide the image processor 150 with information about a position of the high resolution region R2 to control the image processor 150 such that an image corresponding to the high resolution region R2 of the entire screen region R1 has a relatively high resolution and an image corresponding to a remaining screen region R3 excluding the high resolution region R2 has a relatively low resolution. The image processor 150 may generate image data at a high resolution with respect to the high resolution region R2 and generate image data at a low resolution with respect to the remaining screen region R3 under control of the controller 130. According to an exemplary embodiment, the image processor 150 may generate image data having a first resolution with respect to the high resolution region R2 higher than a second resolution with respect to the remaining screen region R3. For example, the image processor 150 may generate image data having a resolution of UHD or full HD (FHD) with respect to the high resolution region R2 and generate a resolution of HD or standard definition (SD) with respect to the remaining screen region R3.

Then, the controller 130 may control the light source driver 122 according to the image data provided from the image processor 150 to drive the laser light source 121. As a result, the controller 130 may control the light source driver 122 based on information about the position of the user's eye obtained from the eye tracker 110 to drive the laser light source 121. The laser light source 121 may operate at a high driving speed to form an image having a relatively small size pixel while projecting an image to the high resolution region R2 and operate at a low driving speed to form an image having a relatively large size pixel while projecting the image to the remaining screen region R3, under control of the light source driver 122. According to an exemplary embodiment, the laser light source 121 may operate at a first driving speed to form an image having a first size pixel while projecting an image to the high resolution region R2 and operate at a second driving speed to form an image having a second size pixel while projecting the image to the remaining screen region R3, under control of the light source driver 122. According to an exemplary embodiment, the first driving speed may higher than the second driving speed, and the first size pixel may be smaller than the second size pixel.

Figure 4:
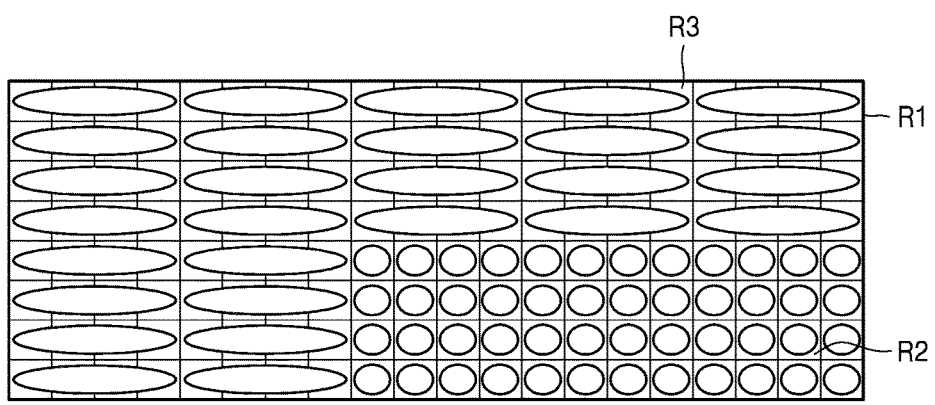
FIG. 4 shows a resolution difference according to an exemplary embodiment in a selected high resolution region and a remaining screen region.

For example, FIG. 4 shows a resolution difference according to an exemplary embodiment in the selected high resolution region R2 and the remaining screen region R3. As shown in FIG. 4, with respect to the high resolution region R2, a driving speed may be increased to reduce pixels of an image, and with respect to the remaining screen region R3, the driving speed may be decreased to enlarge the pixels of the image. In FIG. 4, the size of the pixel in the remaining screen region R3 is illustrated as being four times larger than the size of the pixel in the high resolution region R2. In this case, since the image processor 150 generates only one piece of image data over four pixels in comparison with an image corresponding to the high resolution region R2 with respect to an image corresponding to the remaining screen region R3, the calculation burden of the image processor 150 may be reduced.

Figure 5:
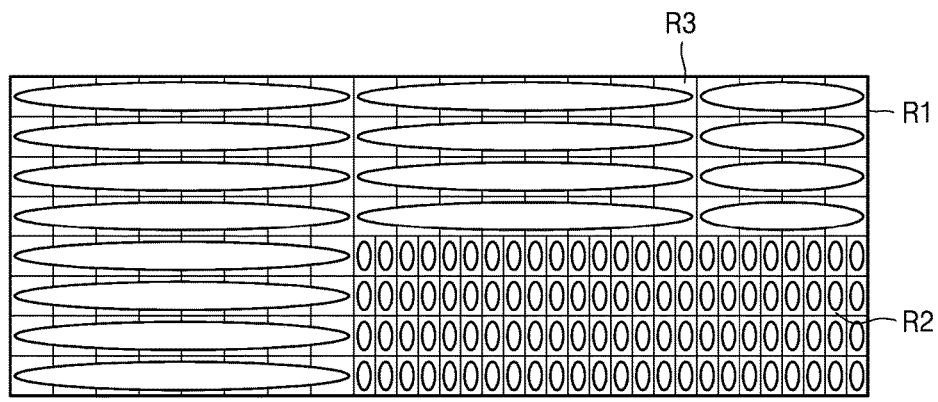
FIG. 5 shows a resolution difference according to another exemplary embodiment in a selected high resolution region and a remaining screen region.

Also, FIG. 5 shows a resolution difference according to another exemplary embodiment in the selected high resolution region R2 and the remaining screen region R3. Referring to FIG. 5, it is possible to further increase resolution with respect to the high resolution region R2 and further reduce resolution with respect to the remaining screen region R3. For example, the resolution of the high resolution region R2 may be increased twice and the resolution of the remaining area R3 may reduced twice compared to that of FIG. 4. In this case, it is possible to provide a higher quality image to a user, while the resolution of the remaining area R3 may be lowered so that the calculation burden of the image processor 150 is not increased. In FIG. 5, the size of the pixel in the remaining screen region R3 is 16 times larger than the size of the pixel in the high resolution region R2 but the present exemplary embodiment is not necessarily limited thereto. For example, the size of the pixel in the remaining screen region R3 may be an integral multiple of the size of the pixel in the high resolution region R2.

Meanwhile, the controller 130 may operate so as to provide a high resolution image only to the high resolution region R2 and not provide any image to the remaining screen region R3 with respect to the position of the user's eye. In this case, the image processor 150 may generate image data only with respect to a portion of the image corresponding to the high resolution region R2 and not generate image data with respect to the remaining screen region R3. In this case, the controller 130 may also operate to control the image capturing apparatus 140 to capture only the portion of the image to be provided to the high resolution region R2. The laser light source 121 may emit a laser beam only while projecting a portion of an image onto the high resolution region R2 and may not emit a laser beam with respect to the remaining screen region R3, under the control of the light source driver 122. If the user's eye is completely deviated from the entire screen region R1, the projection display apparatus 100 may stop projecting the image.

The position of the high resolution region R2 may be changed in accordance with a change of the position of the user's eye. The eye tracker 110 may continuously detect the position of the user's eye to determine the position of the user's eye, and may transmit information about the position of the user's eye to the controller 130 in real time. The controller 130 may then change the position of the high resolution region R2 in real time in response to the change of the position of the user's eye and control operations of the image processor 150 and the light source driver 122 on the basis of the changed position. Thus, even if the user moves his/her eyes in the entire screen region R1, the user may not recognize a change in the resolution and may continuously enjoy the high resolution image. The change of the position of the high resolution region R2 may be made at any time whenever there is the change of the position of the user's eye. Moreover, if a size of the high resolution region R2 is determined to be slightly wider than the angle that the human eye may perceive at one time, the position of the high resolution region R2 may not be changed with respect to a minute variation of the position of the user's eye. In this case, the controller 130 may update the position of the high resolution region R2 only when the user's eye changes over a certain range. For instance, the controller 130 may update the position of the high resolution region R2 only when the position of the user's eye moves more than a predetermined distance.

As described above, since the projection display apparatus 100 according to the present exemplary embodiment tracks the user's eye to provide a high resolution image only in the vicinity of the position of the user's eye and provides a low resolution image in a remaining screen region, efficiency of the projection display apparatus 100 may be increased upon processing an image. Accordingly, the image processing speed of the projection display apparatus 100 may be improved. Also, since the burden of the image processor 150 is small compared to a case of implementing a high resolution image with respect to the entire screen region R1, it is possible to provide the high resolution image to the user while reducing the size of the projection display apparatus 100.

Figure 6:
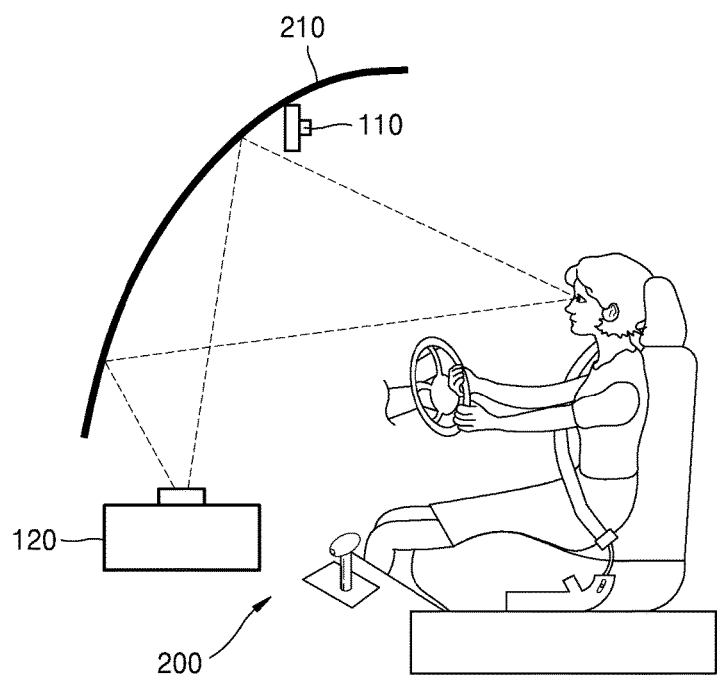
FIG. 6 exemplarily shows a configuration of a head-up display apparatus including the projection display apparatus shown in FIG. 1.

The projection display apparatus 100 may be usefully applied to a field where it is necessary to provide a high resolution image to a user in real time. For example, FIG. 6 exemplarily shows a configuration of a head-up display apparatus 200 including the projection display apparatus 100 shown in FIG. 1. Referring to FIG. 6, the projector 120 may project an image onto the front windshield 210 of a vehicle, and a driver may view the image reflected from the front windshield 210 of the vehicle. Although only the projector 120 is shown in FIG. 6 for the sake of convenience, the head-up display apparatus 200 may include all the configurations of the projection display apparatus 100 shown in FIG. 1. The head-up display apparatus 200 may be mounted in, for example, a dashboard of the vehicle, and provide the driver with a video including state information of the vehicle, driving information of the vehicle, navigation information, a front environment of the vehicle, or a rear environment of the vehicle, etc. However, the eye tracker 110 may be mounted on a ceiling part of the vehicle interior where the driver may be seen. The eye tracker 110 may continuously monitor a position of a driver' pupil and provide the position to the controller 130. The controller 130 may then provide a high resolution image to the position of the driver's pupil in response to the position of the driver's pupil input from the eye tracker 110.

Figure 7:
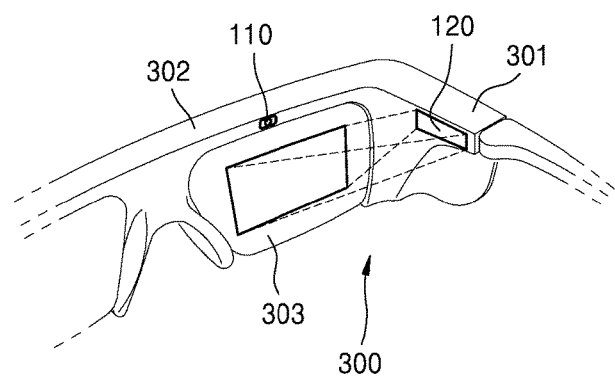
FIG. 7 shows an exemplary configuration of a glasses type augmented reality apparatus including the projection display apparatus shown in FIG. 1.

Also, FIG. 7 shows an exemplary configuration of a glasses type augmented reality apparatus 300 including the projection display apparatus 100 shown in FIG. 1. Referring to FIG. 7, the projector 120 of the projection display apparatus 100 may be disposed on an eyeglass leg 301 to allow the glasses type augmented reality apparatus 300 to be worn on a user's body. The projector 120 may be disposed toward a glasses lens 303 from the glasses leg 301 and may project an image to the glasses lens 303 so that a user may enjoy the image reflected from the glasses lens 303. Also, the eye tracker 110 may be disposed on a glasses frame 302 that fixes the glasses lens 303. The eye tracker 110 may be disposed toward a user's eye in the glasses frame 302 to continuously monitor a position of a user's pupil. Although only the eye tracker 110 and the projector 120 are shown in FIG. 7 for convenience, the glasses type augmented reality apparatus 300 may also include the remaining configurations of the projection display apparatus 100.

Figure 8:
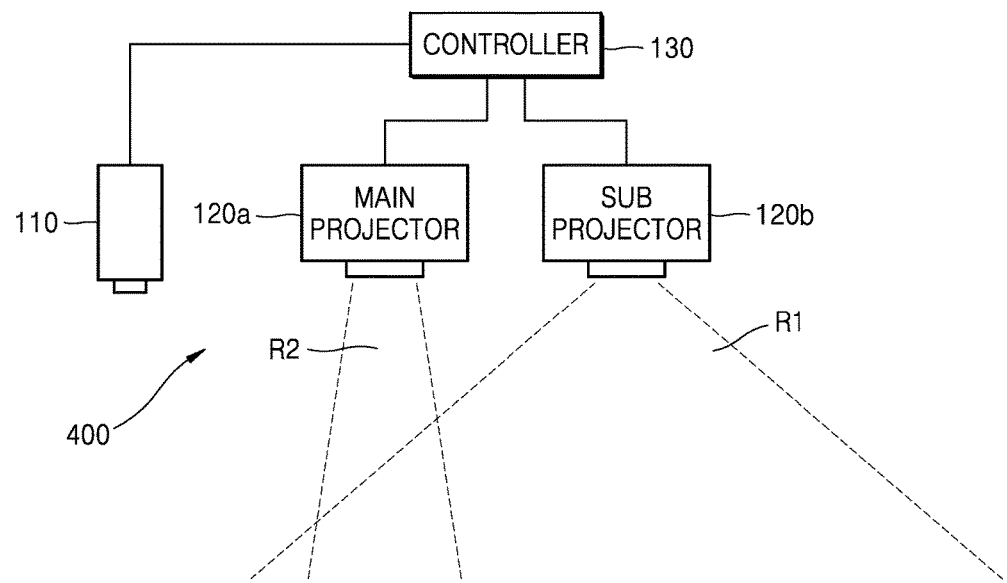
FIG. 8 is a schematic diagram showing a structure of a projection display apparatus according to another exemplary embodiment.

FIG. 8 is a schematic diagram showing a structure of a projection display apparatus 400 according to another exemplary embodiment. Referring to 8, the projection display apparatus 400 may include the eye tracker 110 for tracking a user's eye, a main projector 120*a* for projecting a high resolution image, a sub projector 120*b* for projecting a low resolution image, and the controller 130 for controlling operations of the main projector 120*a* and the sub projector 120*b* in response to a position of the user's eye obtained from the eye tracker 110. Although not shown, the projection display apparatus 400 may further include the image sensing apparatus 140 and the image processor 150 shown in FIG. 1.

The sub projector 120*b* serves to project a relatively low resolution image to the entire screen region R1 shown in FIG. 3. The main projector 120*b* serves to project a relatively high resolution image to the high resolution region R2 determined according to the position of the user's eye. To this end, the controller 130 may control the image processor 150 to generate high resolution image data to be provided to the main projector 120*a* and low resolution image data to be provided to the sub projector 120*b*. Then, the controller 130 may control the main projector 120*a* based on the high resolution image data to project the high resolution image, and control the sub projector 120*b* based on the low resolution image data to project the low resolution image.

According to an exemplary embodiment, an MEMS scanner type projector may be used as the main projector 120*b* and the sub projector 120*b* since an image projection range and resolution of the main projector 120*b* and the sub projector 120*b* are fixed. However, according to other exemplary embodiments, a DLP type or LcoS type projector may also be used. In this case, a projector having a relatively wide projection range and a relatively low resolution is selected as the sub projector 120*b*, and a projector having a relatively narrow projection range and a relatively high resolution may be selected as the main projector 120*a*. For example, a projector having a resolution of UHD or FHD may be selected as the main projector 120*a*, and a projector having a resolution of HD or SD may be selected as the sub projector 120*b*. Since a part of the image projected from the sub projector 120*b* overlaps with the image projected from the main projector 120*a*, the sub projector 120*b* may be adjusted to have a relatively low luminance and the main projector 120*a* may be adjusted to have a relatively high luminance.

The controller 130 may control the main projector 120*a* to project the image onto the high resolution region R2 with respect to the position of the user's eye in response to the position of the user's eye obtained from the eye tracker 110. To this end, the projection display apparatus 400 may further include an image steering apparatus that adjusts a direction of the image projected from the main projector 120*a*. The controller 130 may then control the image steering apparatus in response to the position of the user's eye obtained from the eye tracker 110. The image steering apparatus may include, for example, a galvanometer mirror that reflects an image in a desired direction, a refracting optical system that refracts an image to adjust a traveling direction, or an actuator that adjusts a tilt angle of the main projector 120*a* itself.

Figure 9:
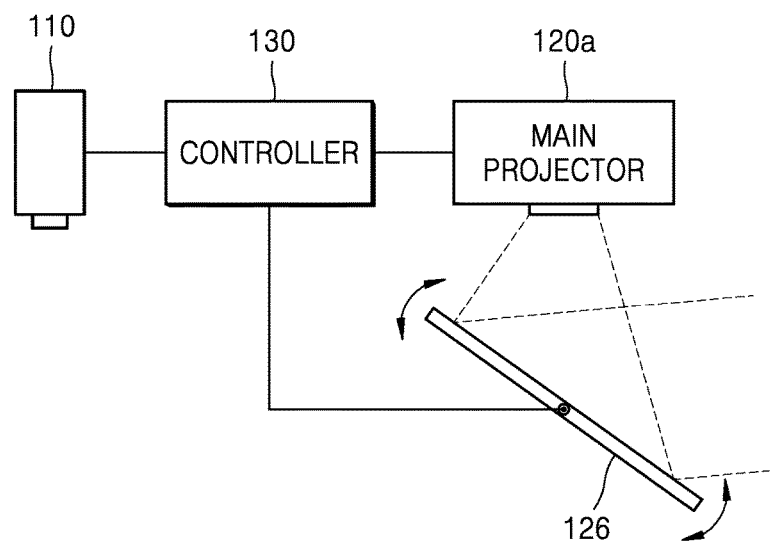
FIG. 9 schematically shows an example in which an image emitted from a main projector of the projection display apparatus shown in FIG. 8 is moved using a galvanometer mirror.

For example, FIG. 9 schematically shows an example in which an image emitted from the main projector 120*a* of the projection display apparatus 400 shown in FIG. 8 is moved using a galvanometer mirror 126 according to an exemplary embodiment. Referring to FIG. 9, when the galvanometer mirror 126 is used as an image steering apparatus, the galvanometer mirror 126 may be disposed in front of the main projector 120*a* and may reflect an image projected from the main projector 120*a*. A position at which the image is projected may be adjusted according to a tilt angle of the galvanometer mirror 126. The controller 130 may adjust the tilt angle of the galvanometer mirror 126 in two axis directions in vertical and horizontal directions in response to a position of a user's eye obtained from the eye tracker 110 to control the image to be projected onto the high resolution region R2 with respect to the position of the user's eye.

Figure 10:
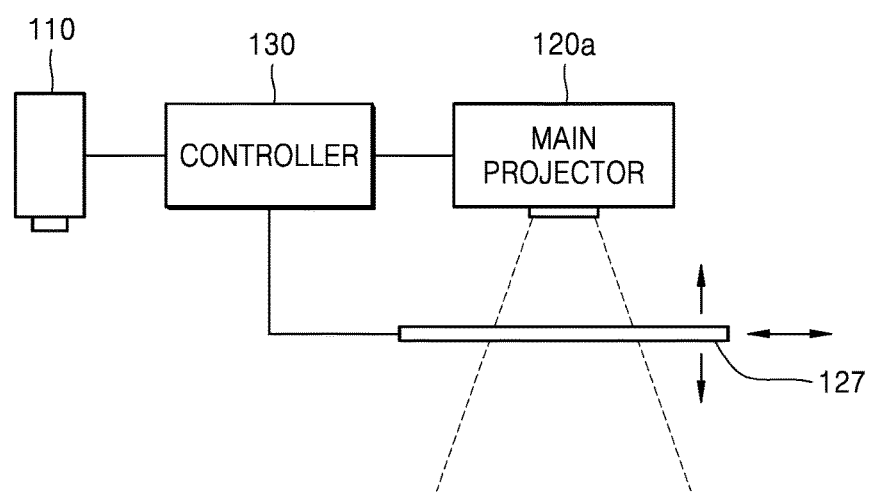
FIG. 10 schematically shows an example in which an image emitted from a main projector of the projection display apparatus shown in FIG. 8 is moved by using a refractive optical system.

Also, FIG. 10 schematically shows an example in which an image emitted from the main projector 120*a* of the projection display apparatus 400 is moved by using a refractive optical system 127 according to an exemplary embodiment. Referring to FIG. 10, when the refractive optical system 127 is used as an image steering apparatus, the refractive optical system 127 may be disposed in front of the main projector 120*a* and may refract an image projected from the main projector 120*a*. For example, the refracting optical system 127 may have a plurality of refracting surfaces having different refractive powers depending on positions. For example, the refracting optical system 127 may include a two-dimensional array of a plurality of prisms having different inclination angles. Accordingly, the image transmitted through the refractive optical system 127 may travel in different directions depending on a position at which the image is incident on the refractive optical system 127. The controller 130 may control a position of the refractive optical system 127 in response to a position of a user's eye obtained from the eye tracker 110 to control the image to be projected onto the high resolution region R2 with respect to the position of the user's eye.

According to an exemplary embodiment, the refractive optical system 127 may have a refractive index varying layer whose refractive index changes electrically. Then, according to a refractive index of the refractive optical system 127, the image transmitted through the refractive optical system 127 may travel in different directions. In this case, the controller 130 may electrically adjust the refractive index of the refractive optical system 127 in response to the position of the user's eye obtained from the eye tracker 110 to control the image to be projected onto the high resolution region R2 with respect to the position of the user's eye.

Figure 11:
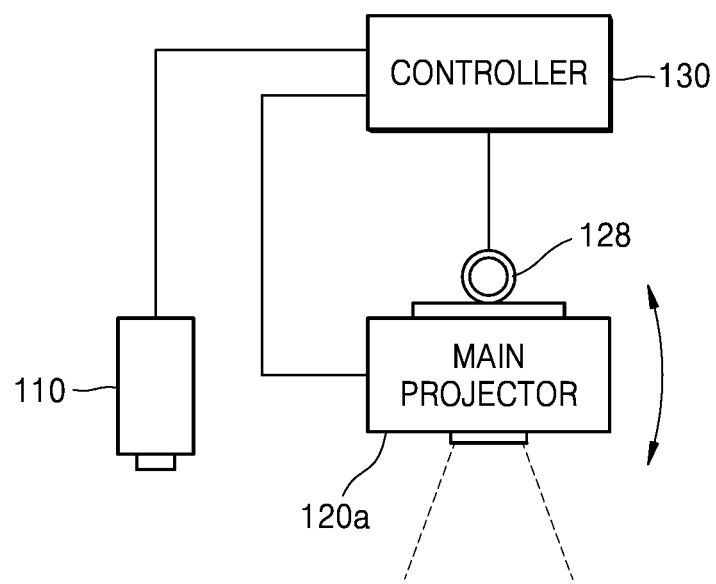
FIG. 11 schematically shows an example in which an image output from the main projector of the projection display apparatus shown in FIG. 8 is moved by using an actuator.

Also, FIG. 11 schematically shows an example in which an image outputted from the main projector 120a of the projection display apparatus 400 is moved by using an actuator 128 according to an exemplary embodiment. Referring to FIG. 11, the main projector 120a may be fixed to the actuator 128, and an inclination angle of the main projector 120a may be biaxially adjusted by the actuator 128 in a vertical direction and a horizontal direction. Therefore, a direction of the image projected from the projector 120a may be adjusted by adjusting the inclination angle of the main projector 120a itself. The same effect may be obtained by using, for example, a linear motor or a rotation type motor instead of the actuator 128. The controller 130 may drive the actuator 128 in response to a position of a user's eye obtained from the eye tracker 110 and electrically adjust the inclination angle of the main projector 120a to control the image to be projected onto the high resolution region R2 with respect to the position of the user's eye.

As described above, when the main projector 120a and the sub projector 120b are used together, the sub projector 120b may project a low resolution image onto the fixed full screen region R1, and the main projector 120a may project a high resolution image to the high resolution region R2 with respect to the position of the user's eye. Accordingly, the overall cost of a projector may be reduced, and the computational burden on the image processor 150 may be reduced, compared with the case of projecting a high resolution image onto the full screen region R1.

On the other hand, in the high resolution region R2, the high resolution image projected from the main projector 120a and the low resolution image projected from the sub projector 120b may overlap. However, the sub projector 120 may not project an image onto the high resolution region R2. For example, the sub projector 120b may project an image partially processed in black onto the high resolution region R2 in response to the position of the user's eye under control of the controller 130. To this end, the image processor 150 may generate image data processed such that only the high resolution region R2 is black according to control of the controller 130 and provide the generated image data to the sub projector 120b.

It should be understood that the projection display apparatus including an eye tracker described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A projection display apparatus comprising:
   an eye tracker configured to track an eye of a user;
   a projector configured to project an image; and
   a controller configured to control the projector, based on a position of the eye of the user obtained from the eye tracker, to perform a first operation to project a first portion of the image at a first resolution onto a first region with respect to the position of the eye of the user and to perform one of a second operation to project a second portion of the image at a second resolution lower than the first resolution onto a second region excluding the first region and a third operation to refrain from projecting the image in the second region.

2. The projection display apparatus of claim 1, wherein the projector comprises:
   a laser light source configured to emit a laser beam;
   a light source driver configured to drive the laser light source;
   a scanner configured to scan the laser beam; and
   a projection optical system configured to project the image based on the laser beam scanned by the scanner.

3. The projection display apparatus of claim 2, wherein the scanner is a microelectromechanical systems (MEMS) scanner.

4. The projection display apparatus of claim 2, wherein the controller is further configured to control the light source driver based on the position of the eye of the user obtained from the eye tracker.

5. The projection display apparatus of claim 3, wherein the controller is further configured to reduce a size of a pixel in the first region by controlling the light source driver to increase a driving speed of the laser light source while the first portion of the image is projected onto the first region.

6. The projection display apparatus of claim 3, wherein the controller is further configured to increase a size of a pixel in the second region by controlling the light source driver to reduce a driving speed of the laser light source while the second portion of the image is projected onto the second region.

7. The projection display apparatus of claim 6, wherein the pixel size of the second region is an integral multiple of a size of a pixel of the first region.

8. The projection display apparatus of claim 1, further comprising:
   an image capturing apparatus configured to obtain an electrical signal; and
   an image processor configured to process the electrical signal obtained by the imaging apparatus to generate image data.

9. The projection display apparatus of claim 8, wherein the controller is further configured to control the image processor to generate the first portion of the image having the first resolution corresponding to the first region and the second portion of the image having the second resolution corresponding to the second region.

10. The projection display apparatus of claim 8, wherein the projection display apparatus is configured to display the image in real time based on the image data.

11. The projection display apparatus of claim 8, wherein the controller is further configured to control the image capturing apparatus to capture only the first portion of the image corresponding to the first region.

12. The projection display apparatus of claim 1, wherein the projector comprises:
   a first projector configured to project the first portion of the image having the first resolution onto the first region;
   a second projector configured to project the second portion of the image having the second resolution to both the first region and the second region or only to the second region; and
   an image steering apparatus configured to adjust a direction of the portion of the image projected from the first projector.

13. The projection display apparatus of claim 12, wherein the controller is further configured to control the image steering apparatus to project the first portion of the image onto the first region with respect to the position of the eye of the user in response to the position of the eye of the user obtained from the eye tracker.

14. The projection display apparatus of claim 12, wherein the image steering apparatus comprises one of:
   a galvanometer mirror configured to reflect the projected image in a desired direction;
   a refracting optical system configured to refract the projected image to adjust a traveling direction of the projected image;
   an actuator configured to adjust an angle of the first projector;
   a linear motor configured to adjust the angle of the first projector, and
   a rotation type motor configured to adjust the angle of the first projector.

15. The projection display apparatus of claim 12, further comprising:
   an image capturing apparatus configured to obtain an electrical signal; and
   an image processor configured to process the electrical signal obtained by the image capturing apparatus to generate image data.

16. The projection display apparatus of claim 15, wherein the controller is further configured to control the image processor to generate first image data corresponding to the first portion of the image having the first resolution to be provided to the first projector and second image data corresponding to the second portion of the image having the second resolution to be provided to the second projector.

17. The projection display apparatus of claim 16, wherein the first and second projectors comprise one of digital light processing (DLP), liquid crystal on silicon (LCoS), and microelectromechanical systems (MEMS) scanner type projectors.

18. The projection display apparatus of claim 17, wherein the controller is further configured to control the first projector based on the first image data and control the second projector based on the second image data.

19. A head-up display apparatus comprising:
   a projection display apparatus comprising:
      an eye tracker configured to track an eye of a user;
      a projector configured to project an image; and
      a controller configured to control the projector based on a position of the eye of the user obtained from the eye tracker, to perform a first operation to project a first portion of the image at a first resolution onto a first region with respect to the position of the eye of the user and to perform one of a second operation to project a second portion of the image at a second resolution lower than the first resolution onto a second region excluding the first region and an a third operation to refrain from projecting the image in the second region.

20. An augmented reality apparatus comprising:
   a projection display apparatus comprising:
      an eye tracker configured to track an eye of a user;
      a projector configured to project an image; and
      a controller configured to control the projector based on a position of the eye of the user obtained from the eye tracker, to perform a first operation to project a first portion of the image at a first resolution onto a first region with respect to the position of the eye of the user and to perform one of a second operation to project a second portion of the image at a second resolution lower than the first resolution onto a second region excluding the first region and a third operation to refrain from projecting the image in the second region.

21. A projection display apparatus comprising: a projector comprising:
   a laser light source configured to emit a laser beam;
   a scanner configured to scan the laser beam; and
   a projection optical system configured to project an image based on the laser beam scanned by the scanner; and
   a controller configured to:
   receive eye tracking information on an eye of a user;
   control the laser light source to operate at a first driving speed while projecting a first portion of the image to a first region corresponding to a position of the eye of the user in the eye tracking information; and
   control the laser light source to operate at a second driving speed while projecting a second portion of the image to a second region,
   wherein the first driving speed is higher than the second driving speed.

22. The projection display apparatus according to claim 21, wherein the scanner is further configured to:
   divide at least a pixel of the first portion of the image projected to the first region based on the first driving speed; and
   merge two or more of the pixels of the second portion of the image projected to the second region based on the second driving speed.

23. The projection display apparatus according to claim 21, wherein the second portion of the image includes the first portion of the image.

\* \* \* \* \*